United States Patent [19]

Austvold et al.

[11] Patent Number: 5,317,676
[45] Date of Patent: May 31, 1994

[54] APPARATUS AND METHOD FOR FACILITATING USE OF A NEURAL NETWORK

[75] Inventors: Shawn M. Austvold; Joseph P. Bigus; Jonathan D. Henckel; Paul A. Hospers, all of Rochester, Minn.

[73] Assignee: International Business Machines Corporation, Armonk, N.Y.

[21] Appl. No.: 986,889

[22] Filed: Dec. 3, 1992

Related U.S. Application Data

[63] Continuation of Ser. No. 687,364, Apr. 18, 1991, abandoned.

[51] Int. Cl.$^5$ .............................................. G06F 15/18
[52] U.S. Cl. ..................................... 395/26; 395/76; 395/21
[58] Field of Search ...................... 395/22, 23, 24, 27, 395/76, 26; 364/715.03, 715.05

[56] References Cited

U.S. PATENT DOCUMENTS

| 4,908,746 | 3/1990 | Vaughn | 364/147 |
|---|---|---|---|
| 4,914,603 | 4/1990 | Wood | 364/513 |
| 4,914,708 | 4/1990 | Carpenter et al. | 395/24 |
| 4,945,494 | 7/1990 | Penz et al. | 395/22 |
| 4,954,963 | 9/1990 | Penz et al. | 395/22 |
| 4,972,187 | 11/1990 | Wecker | 341/95 |
| 4,979,126 | 12/1990 | Pao et al. | 395/24 |
| 5,036,479 | 7/1991 | Prednis et al. | 364/580 |
| 5,097,411 | 3/1992 | Doyle et al. | 395/100 |
| 5,216,750 | 6/1993 | Smith | 395/24 |

FOREIGN PATENT DOCUMENTS

WO8909449 10/1989 PCT Int'l Appl. .......... G06F 15/18

OTHER PUBLICATIONS

Passino et al, "Neural Computing for Numeric-to-Symbolic Conversion in Control Systems," IEEE Control Systems Magazine, 1989, pp. 44–52.

"Neural Nets They Learn From Examples", Chemical Engineering, August 1990.

"An Introduction to Neural to Neural Nets", Phiroz Bhagat, Exxon Research & Engineering Co., Florham Park, N.J. 07932, Chemical Engineering Progress, Aug. 1990.

"Automated Design of Neural Networks For Symbolic Signal Processing", IEEE, 1989, Andrea Maccato & Rui J. P. de Figueiredo, Rice Univ. Houston, Tex. 77251-1802.

"A Graphical Design System for Neural Networks", Greg Hood, Computer Science Dept., Carnegie Mellon University, Pittsburgh, Pa. 15213.

*Primary Examiner*—Allen R. MacDonald
*Attorney, Agent, or Firm*—Roy W. Truelson

[57] ABSTRACT

A neural network development utility assists a developer in generating one or more filters for data to be input to or output from a neural network. A filter is a device which translates data in accordance with a data transformation definition contained in a translate template. Source data for the neural network may be expressed in any arbitrary combination of symbolic or numeric fields in a data base. The developer selects those fields to be used from an interactive menu. The utility scans the selected field entries in the source data base to identify the logical type of each field, and creates a default translate template based on this scan. Numeric data is automatically scaled. The developer may use the default template, or edit it from an interactive editor. When editing the template, the developer may select from a menu of commonly used neural network data formats, and from a menu of commonly used primitive mathematical operations. The developer may interactively define additional filters to perform data transformations in series, thus achieving more complex mathematical operations on the data. Templates may be edited at any time during the development process. If a network does not appear to be giving satisfactory results, the developer may easily alter the template to present inputs in some other format.

25 Claims, 8 Drawing Sheets

DATA TRANSLATE TEMPLATE

| 551 | 552 | 553 | 554 | 555 | 556 | 557 | 558 | 559 |
|---|---|---|---|---|---|---|---|---|
| V2RIM00491 | 7 | 6 | 6 | 0 | 1 | 4 | 1 | 16 |

| | 570 | 571 | | | | | | |
|---|---|---|---|---|---|---|---|---|
| 511 Color | 0 | 1 | 5 | 0 | 11 | 0 | 0 | 1 |
| 512 Profile | 0 | 1 | 5 | 0 | 11 | 0 | 0 | 1 |
| ... | ... | ... | ... | ... | ... | ... | ... | ... |
| 513 CoinType | 1 | 1 | 5 | 11 | 0 | 0 | 7 | 4 |

| | 572 | 573 | 574 | 575 | 576 | 577 |
|---|---|---|---|---|---|---|

| 521 Color | 2 |
| 522 bronze | 0.000000 |
| 523 silver | 1.000000 |
| 524 Profile | 2 |
| 525 right | 0.000000 |
| 526 left | 1.000000 |
| ... | ... |
| 527 CoinType | 4 |
| 528 penny | 1.000000 |
| 529 nickel | 2.000000 |
| 530 dime | 3.000000 |
| 531 quarter | 4.000000 |

FIG. 5

APPARATUS AND METHOD FOR FACILITATING USE OF A NEURAL NETWORK

This is a continuation of U.S. Ser. No. 07/687,364 filed Apr. 18, 1991, now abandoned.

FIELD OF THE INVENTION

The present invention relates to data processing systems, and in particular to improving the usability of a neural network executing on a computer system.

BACKGROUND OF THE INVENTION

Modern computer systems are being used to solve an ever increasing range of complex problems. The use of computers to perform tasks normally associated with human reasoning and cognition is known as artificial intelligence. As the capabilities of computers expand, they are increasingly being used to perform tasks in the field of artificial intelligence. However, although computer hardware to perform complex tasks is available, it is very difficult and time-consuming to write artificial intelligence programs.

In recent years, there has been an increasing amount of interest in solving complex problems with neural networks. A neural network is a collection of simple processors (nodes) connected together, each processor having a plurality of input and output connections. Each processor evaluates some relatively simple mathematical function of the inputs to produce an output. Some of the processor nodes receive input or produce output external to the neural network, but typically most connections run between nodes in the network. An adaptive weighting coefficient is associated with each connection. A neural network is trained to solve a particular problem by presenting the network with examples of input data for the problem and the desired outputs. The neural network adjusts the weighting coefficients to minimize the difference between the output values of the network and the desired output values of the training data. Ideally, a neural network consists of physically separate processor nodes. However, such a neural network is frequently simulated on a single processor computer system with suitable programming. As used herein, the term "neural network" shall encompass an ideal neural network of separate physical processors for each node as well as a simulated neural network executing on a single or other multiple processor computer system.

The promise of neural networks has been that they can be programmed with far less programming effort and expertise than conventional application programs designed to solve problems in the field of artificial intelligence. In theory, the neural network requires no programming at all. Instead, the system is fed a large amount of training data, and finds the solution to the problem based on this data. In reality, constructing a neural network solution is not so simple. A neural network requires that data be presented to it in a suitable form. The programmer must decide what information is to be used as input and output, how this information is to be presented, and other matters. Except in the rare case where information is stored in a form directly usable by the neural network, the programmer will have to create conversion routines to convert raw data into a form which the neural network can use, and to convert the network output into some desired form. The need to code and maintain such conversion functions reduces the benefits that would otherwise be present in neural network applications, and makes it difficult for persons without appropriate programming expertise to build such applications.

Considerable research and development effort has been directed toward making the neural network itself run more efficiently and solve a wider range of problems. However, there has been little emphasis on making the network easier to use. As the capabilities of neural networks increase, an increasing portion of the effort of developing a neural network application will be devoted to the problem of converting input data to an appropriate form for use by the network, and converting output data to an appropriate form for the user. At the same time, as increasing numbers of people develop neural network solutions, the programming sophistication of the average user is likely to decline. Accordingly, there exists a need for mechanisms that will assist the developer of neural network applications in converting input and output data.

It is therefore an object of the present invention to provide an enhanced method and apparatus for using a neural network.

Another object of this invention is to provide an enhanced method and apparatus for developing a neural network application.

Another object of this invention to provide an enhanced method and apparatus for converting data input and output of a neural network.

Another object of this invention is to reduce the cost of developing a neural network application.

Another object of this invention is to reduce the amount of time and effort required to develop a neural network application.

Another object of this invention is to reduce the level of expertise required of the developer of a neural network application.

Another object of this invention is to facilitate the modification of data representation in a neural network during the development of a neural network application.

SUMMARY OF THE INVENTION

A neural network requires numeric data, preferably scaled to some common range, as input values, and produces numeric data as output. A neural network development utility assists a developer in creating and changing one or more filters for data to be input to or output from a neural network. A filter is simply a data translation device which translates data in accordance with a data transformation definition contained in a translate template.

Source data for the neural network may be expressed in any arbitrary combination of symbolic or numeric fields in a data base. The developer selects those fields to be used as input, to be used as output, or to be ignored from an interactive menu. The utility then scans the selected field entries in the source data base to identify the logical type of each field, and creates a default translate template for the filter based on this scan. Numeric data is automatically scaled. The developer may use the default template, or edit it from an interactive screen editor. When editing the template, the developer may select from a menu of commonly used neural network data formats, and from a menu of commonly used primitive mathematical operations. The developer may interactively define additional filters to perform data transformations in series, thus achieving more complex mathematical operations on the data. Templates may be edited at any time during the development process. If a neural network does not appear to be giving satisfactory results, the developer may easily alter the template to present inputs in some other format.

In the preferred embodiment, the invention is integrated into a single encompassing neural network development utility. The utility contains a plurality of neural network simulation models and support for defining, creating, training and running a neural network application.

BRIEF DESCRIPTION OF THE DRAWINGS

FIG. 5 shows the structure of a data translate template according to the preferred embodiment;

DETAILED DESCRIPTION OF THE PREFERRED EMBODIMENT

This patent application is related to commonly assigned U.S. Pat. No. 5,142,665 to Bigus, issued Aug. 25, 1992 incorporated herein by reference. This patent application is also related to commonly assigned U.S. patent application Ser. No. 07/687,582, filed Apr. 18, 1991, entitled "Enhanced Neural Network Shell for Application Programs", incorporated herein by reference.

Figure 1:
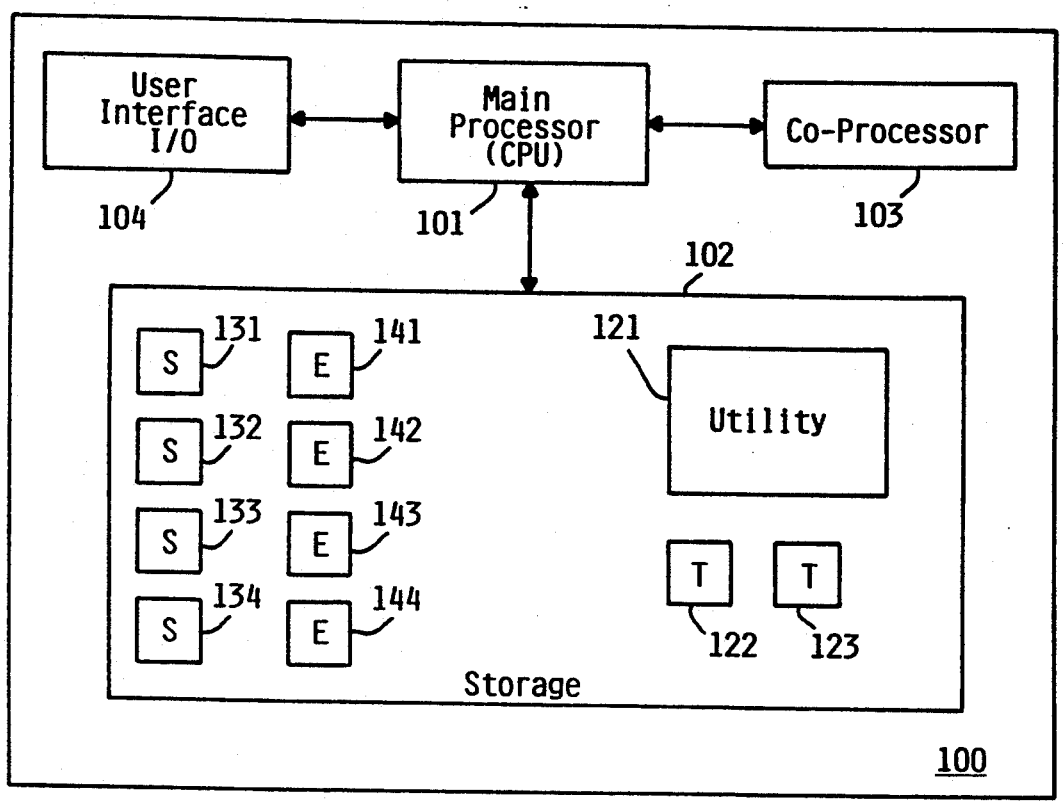
FIG. 1 is a block diagram of the computer system according to the preferred embodiment of this invention.

FIG. 1 shows a block diagram of the computer system of the present invention. Computer system 100 comprises main or central processing unit (CPU) 101 connected to data storage 102. Storage 102 can be a primary memory such as RAM, secondary memory such as a magnetic disk drive, or combination of different data recording devices. CPU 101 is in the preferred embodiment connected to co-processor 103. Co-processor 103 may provide generic math calculation functions (a math co-processor) or specialized neural network hardware support functions (a neural network processor). Co-processor 103 is not necessary if CPU 101 has sufficient processing power to handle an intensive computational workload without unacceptable performance degradation. CPU 101 is also connected to user interface 104. User interface 104 allows developers and users to communicate with computer system 101, normally through a programmable workstation.

Data storage 102 contains neural network development utility 121, one or more translate templates 122-123, one or more source data files 131-134, and one or more encoded data files 141-144. While storage 102 is shown in FIG. 1 as a monolithic entity, it should be understood that it may comprise a variety of devices, and that not all programs and files shown will necessarily be contained in any one device. For example, portions of neural network utility 121 will typically be loaded into primary memory to execute, while source data files will typically be stored on magnetic or optical disk storage devices.

In the preferred embodiment, computer system 100 is an IBM Application System/400 midrange computer, although any computer system could be used. Co-processor 103 is preferably a processor on the Application System/400 computer, but could also be the math co-processor found on personal computers, such an the IBM PS/2 computer. In this case, CPU 101 and co-processor 103 would communicate with each other via IBM PC Support. In this preferred embodiment, utility program 121 supports simulation of a neural network on a general purpose computer system.

Figure 2:
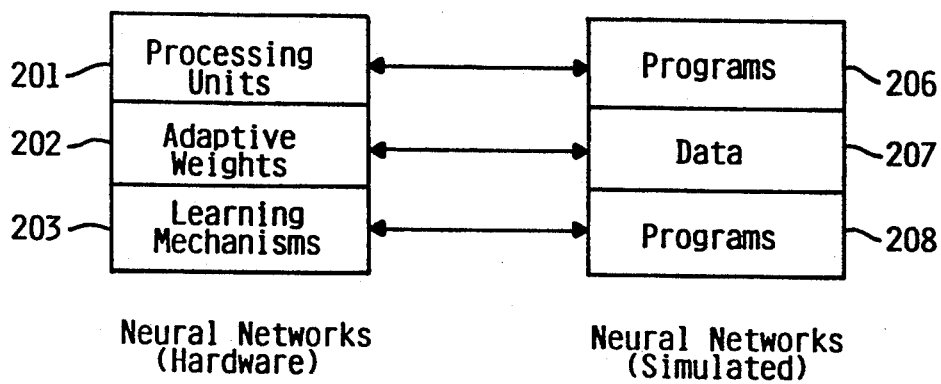
FIG. 2 shows how a massively parallel hardware implemented neural network can be simulated on a serial Von Neumann based computer system.

FIG. 2 shows how an ideal neural network (parallel processors) can be simulated on a Von Neumann (serial) processor system. There are many different neural network models with different connection topologies and processing unit attributes. However, they can be generally classified as computing systems which are made of many (tens, hundreds or thousands) simple processing units 201 which are connected by adaptive (changeable) weights 202. In addition to processors and weights, a neural network model must have a learning mechanism 203, which operates by updating the weights after each training iteration.

A neural network model can be simulated on a digital computer by programs and data. Programs 206 simulate the processing functions performed by neural network processing units 201, and adaptive connection weights 202 are contained in data 207. Programs 208 are used to implement the learning or connection weight adaptation mechanism 203.

Figures 3, 4:
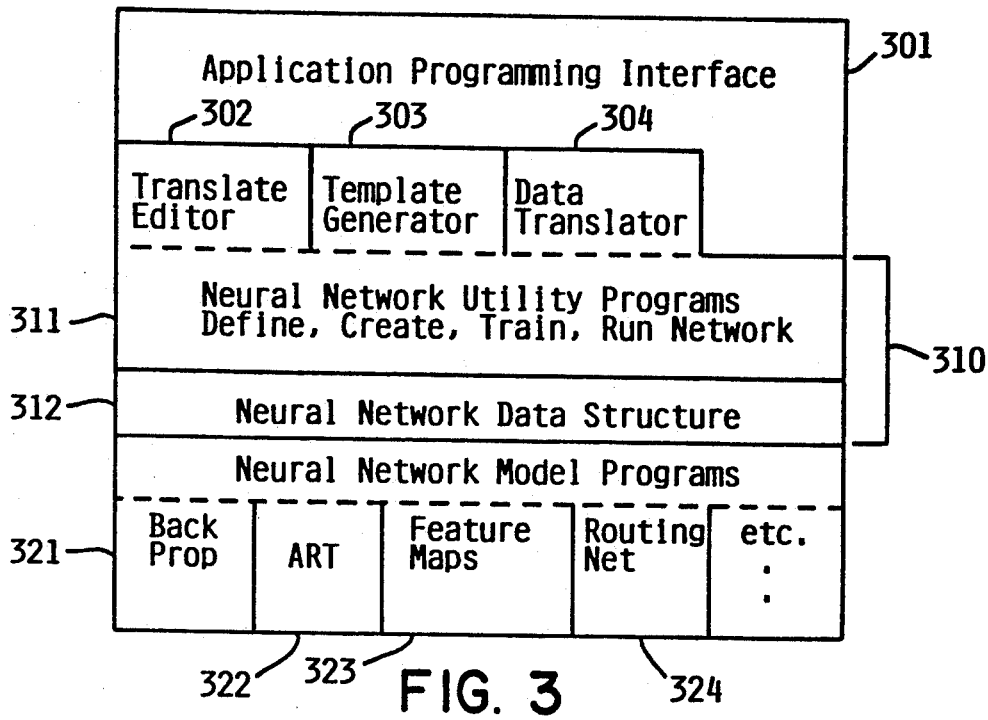
FIG. 3 shows the conceptual layout of a neural network utility according to the preferred embodiment.
FIG. 4 shows the structure of a simple source data file and corresponding encoded data file, according to the preferred embodiment.

FIG. 3 shows the conceptual layout of utility 121 and how it relates to application software. Utility 121 is an integrated set of programs and data structures supporting neural network development and operation. At the highest level is application programming interface (API) 301. API 301 is a formally specified interface which allows application developers lacking expert knowledge of neural networks to access and use the utility programs and data structure of neural network shell 310 in their application programs.

Neural network shell 310 consists of a set of utility programs 311 and a neural network data structure 312. Shell 310 provides the capability for easily and efficiently defining, creating, training, and running neural networks in applications on conventional computing systems.

Any neural network model, such as example models 321-324, can be supported by neural network shell 310 by defining a generic neural network data structure 312 which can be accessed by all of the utility programs in neural network shell 310. Each neural network model is mapped onto this generic neural network data structure. Programs specific to each neural network model are called by neural network utility programs 311.

API 301 comprises three program modules for facilitating the conversion of source data to target (encoded)

data neural network input, and source encoded data network output to target data in usable form. Translate editor 302 is an interactive editor program which allows a neural network developer to define one or more data filters and to edit data translate templates for filters previously created. Template generator 303 is a program which scans a source file, determines the logical data type of the defined source fields of interest, and generates a default data translate template. Data translator 304 converts data in accordance with a previously defined translate template.

The operation of elements of utility program 121 below the level of API 301 is described in commonly assigned U.S. Pat. No. 5,142,665 to Bigus, issued Aug. 25, 1992, and in commonly assigned patent application Ser. No. 07/687,582, filed Apr. 18, 1991, entitled "Enhanced Neural Network Shell for Application Programs", both of which are herein incorporated by reference. The present invention increases the usability of the invention disclosed in the referenced patent applications, although it should be understood that the present invention could be practiced with other forms of neural networks or neural network support programs. API 301 is a conceptual level of application programming. In the previously disclosed invention, the boundary between API 301 and neural network shell 32 defined the form of data that the user must provide the network. This boundary also separated what the user must provide from what the disclosed invention provided for him. The present invention greatly reduces the difficulty of meeting that interface boundary by providing the user with a set of programs to convert his data for him. The translate editor 302, template generator 303 and data translator 304 are shown in FIG. 3 above the API interface boundary because they enable the user to meet the interface. This in effect extends the utility above the interface boundary, as depicted by the dashed line boundary in FIG. 3. The utility program of the preferred embodiment still permits a user to write his own data conversion routines to meet the interface (as depicted by that portion of the API extending to the solid boundary), but in that case he would not be utilizing the capabilities of the present invention. The operation of the utility of the preferred embodiment is more fully described in Attachment 1 entitled "Neural Network Utility/400: User's Guide", and Attachment 2 entitled "Neural Network Utility/400: Programmer's Reference".

FIG. 4 shows the structure of a simple source data file 131 and corresponding target (encoded) data file 141. Source data file 131 comprises a plurality of data base records 401-404, each record comprising a plurality of fields 411-417. A source data file field may be an input field (411-416), an output field (417), or a field to be ignored (not shown). Encoded data file 141 comprises a plurality of records 421-424, each corresponding to one of the records in source data file 131. Each record 421-424 in encoded data file 141 comprises an input vector 431 corresponding to input fields 411-416, and an output vector 432 corresponding to output field 417. FIG. 4 depicts training data files for a neural network which classifies coins. For example, field 411 contains the color of the coin, field 412 the direction in which the figure is facing, etc. While six input fields 411-416 and one output field 417 are shown in FIG. 4, it should be understood that the actual number of input and output fields may vary. In the example of FIG. 4, source data is in symbolic form and target data is encoded for the neural network, as would be the case of a data filter for input data. It should be understood that in the case of a data filter for output data, source data will typically be in encoded numeric form, and target data may be symbolic.

FIG. 5 shows the structure of a data translate template 122. Template 122 is a variable length file, comprising a header section 501, a translate section 510 containing one or more translate records 511-513, and optionally a dictionary section 520 containing one or more dictionary records 521-31. Template 122 contains one translate record 511-513 for each field in 411-417 in source data file 131 (only three translate records are shown).

Header section 501 contains the following fields. Version field 550 contains the version number of the software program that created the template. Version field 550 is used to detect data structure and software mismatches. NumFields field 551 contains the total number of fields 411-417 in each record of the source data file; this number corresponds to the number of translate records 511-513 in translate template 122. TotalInputs field 552 contains the total number of data items which make up the fields in the source data file. This is the summation of values contained in each NumIn field 572 of the translate records 511-513, and is used to determine the size of the input buffer required for translator program 304. NumInFields field 553 and NumOutFields field 556 contain the total number of input and output fields respectively in each record of the source data file; this number corresponds to the number of translate records 511-513 with a Usage field 571 of INPUT and OUTPUT, respectively. NumInUnits field 554 and NumOutUnits field 557 contain the total number of data items which make up the fields in the target data file, corresponding to inputs and outputs respectively. This is the summation of values contained in each NumOut field 577 of the translate records 511-513 with a usage field 571 of INPUT or OUTPUT, respectively. InDataType field 555 and OutDataType field 558 contain the logical data type of the source data file and target data file, respectively, which may be either SYMBOLIC or NUMERIC. DictSize field 559 contains the total number of symbol to value mappings in dictionary records 521-31.

Translate section 510 comprises a plurality of translate records 511-513, each containing the following fields. Name field 570 identifies the name of the field, usually taken from the data base file description. Name helps to identify the meaning of the field to the user. Usage field 571 denotes the field usage, either INPUT, OUTPUT or IGNORE. NumIn field 572 contains the number of data items in the source file that make up the logical field. A logical input field often contains only one element, in which case this number is 1. However, an array of data elements may be considered a single logical field, in which case NumIn contains the number of elements in the array. This may be translated to a single element or multiple elements, depending on the translate template values. InType field 573 and OutType field 576 contain the logical data type of the inputs. The possible data types are explained below. Operator field 574 contains the code for the numeric operator applied to the data during the translation process. OpPosition field 575 defines whether the numeric operator identified by Operator field 575 is applied inline, pre or post the symbolic translations. NumOut field 577 contains the number of data items in the target file that make up the logical field. This field contains information analogous to that in NumIn field 572. NumOp field (not shown) is an optional field containing the number of additional parameters used for the numeric operator. It is required only if the numeric operator is SCALE or THRESHOLD. In this case, NumOp field is followed by OpData field (not shown), containing a variable number of additional values as indicated by NumOp field. These OpData values are the scaling or threshold parameters.

The dictionary section of the template 520 contains dictionary records 521-31 which map each symbolic value to a numeric value. Each dictionary record 521-31 contains a Symbol field 590 and a value field 591. The records occur in groups, the first record in each group 521,524,527 containing the field name in its Symbol field 590 and the number of mappings (dictionary records remaining in the group) in its Value field 591. The remaining records of the group 522-3,525-6, 528-31, each contain a single mapping of a symbolic value in Symbol field 590 to a numeric value in Value field 591.

Each field is classified as some logical data type. In a general sense, the translator 304 converts data in each field from the input logical type specified in InType field 573 to the output logical type specified in OutType field 576. These two fields may be the same. The logical data type is to be distinguished from the format in which bits are physically recorded in data storage 102. For example, either a text file or a binary file may contain numeric data, but a text file would store it as a string of numeric characters using a defined format such as ASCII or EBCDIC, while a binary file would store numeric data as bits of 0's and 1's. The logical data type is a higher level of abstraction, and refers to the meaning of the data. Knowledge of both the logical data type and the low level recording format of a file are needed to interpret data. The following logical data types are supported:

BINARY: A binary type is a sequence of 1's and 0's of a specified length, interpreted as a binary number. The length (number of 1's and 0's) is specified in NumIn 572 or NumOut 577, as the case may be. If length is 1, it acts like a Boolean value.

CHARACTER: A character type is a single byte of untranslated data.

INTEGER: An integer number. ONE-OF-N: A one-of-N type is a sequence of 1's and 0's in which only one of the numbers in the sequence is 1, and all the others are 0. One-of-N maps to a value equal to the position of the 1 in the sequence.

REAL: A real number.

SCATTER: A scatter type is a sequence of 1's and 0's having a special mapping to integer values. In the preferred embodiment, the mapping is that described in a paper entitled "A Random Walk in Hamming Space" by Smith & Stanford, presented at International Joint Conference on Neural Networks, San Diego, 1990 (Vol. II, p. 465), incorporated herein by reference, although other scatter mappings could be used.

SYMBOL: A symbol type is an arbitrary string of characters. It maps to a value specified in a corresponding dictionary record.

THERMOMETER: A thermometer type is a sequence of 1's and 0's in which all numbers at or below some position in the sequence are 1's and all numbers above that position are 0's. The thermometer type maps to a value equal to the position of the highest 1.

In addition to the above enumerated logical data types, the types BINARY-VECTOR, INTEGER-VECTOR, REAL-VECTOR and SYMBOL-VECTOR are supported. The vector designation is a shorthand way of specifying that a common transformation operation will be applied to all individual elements of a vector. The same result could be achieved by creating a plurality of individual translate records having identical transformation specifications, one for each element of the vector, using the corresponding non-vector logical data type.

Template fields which contain enumerated type variables, such as InDataType 555, OutDataType 558, Usage 571, InType 573, OutType 576, Operator 574, etc., in fact contain integers corresponding to the variables of the enumerated type. In this application, the values of these variables have been denoted as phrases in all capital letters for ease of understanding. For example, the actual value in Usage field 571 will be an integer of 0, 1, or 2, each value corresponding to one of the possible enumerated types, INPUT, OUTPUT or IGNORE.

The operation of the present invention in the preferred embodiment will now be described. This invention may be used in either a development environment or a production (post-development) environment. In the development environment, filters are defined and templates created and edited with the template generator 303 and translate editor 302. Source training data is translated by the translator program 304 and fed into the neural network. The network results are analyzed and adjustments made to the templates if necessary, again using the editor 302. Several iterations of training data and adjustments to the filters may be required before the network achieves satisfactory results. In the production environment, neither the translate editor 302 nor the template generator 303 is used. Source data is translated using the translator 304 in accordance with previously created templates, and used in conjunction with the previously trained neural network.

Figure 6:
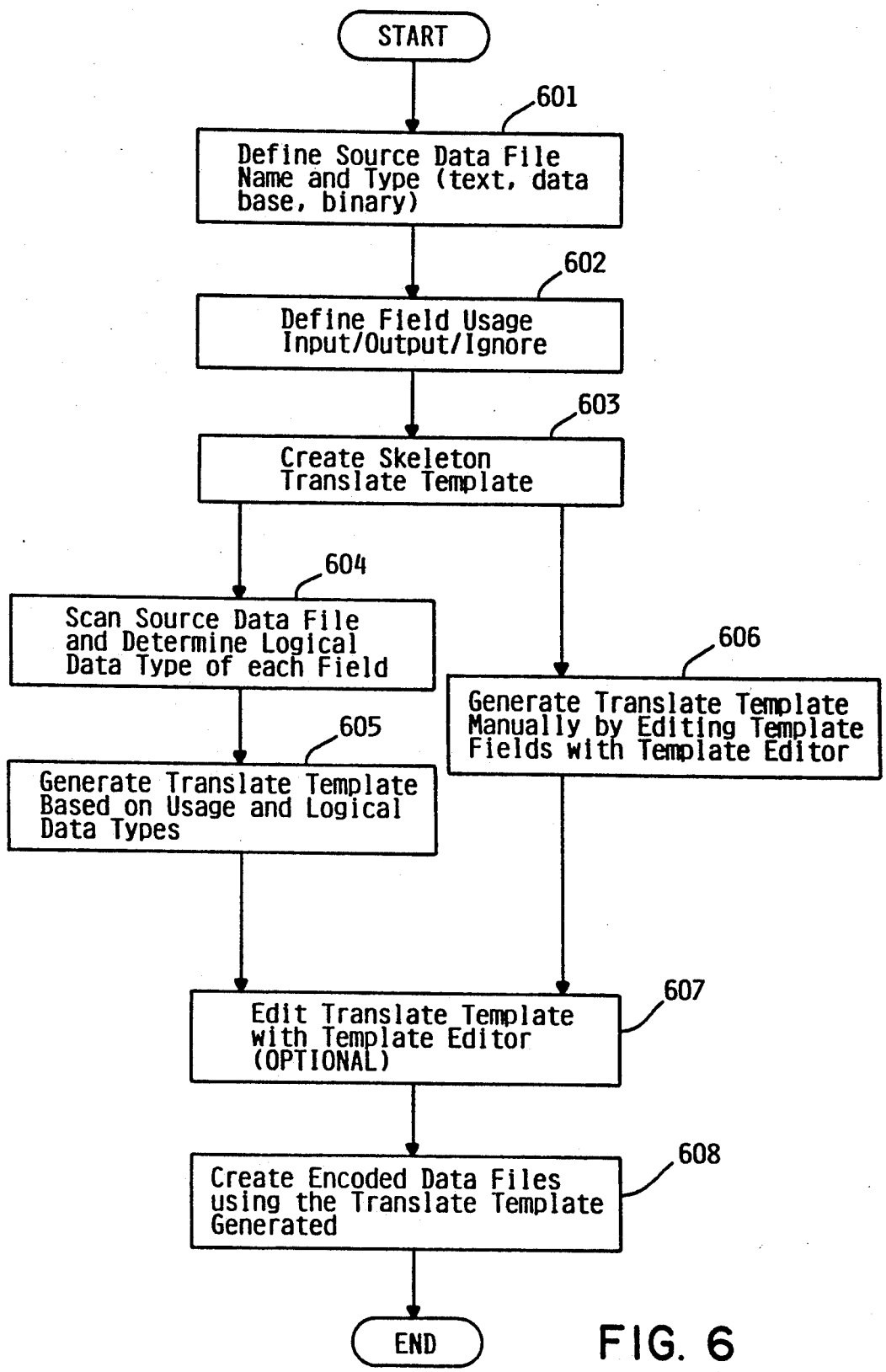
FIG. 6 shows the major steps required in generating an encoded neural network training data set and translate template according to the preferred embodiment.

FIG. 6 shows the major steps required in generating an encoded neural network training data set and translate template. The developer invokes translate editor 302 to define one or more filters, each filter operating on a source data file. The developer first identifies the source data file and the file type (e.g., text, binary or database) at step 601. The file type identifies the data recording format at a low level, necessary for the program to read the data in the file. Editor 302 then obtains the field usage of each field from the developer at 602. Field usage may be INPUT, OUTPUT or IGNORE. If the file is a database file, editor 302 automatically retrieves the database definition of each field. If the file is text or binary, the developer must define the delimiters or length of the fields. When the fields and their usage have been defined, the editor creates a skeleton translate template containing these values at 603. The developer may then invoke template generator 303 to automatically create a complete translate template. Template generator scans the source file and determines the logical data type of each field in the file at 604. From this information and that previously input by the developer, it generates the translate template at 605. In the alternative, the developer may input all required values to the template editor manually, without using the template generator 303 at step 606. Once a complete template has been created, it may be edited with the template editor at 607. When editing of the template is complete, translator 304 creates an encoded data file by translating the source data file in accordance with the transformation definition contained in the translate template at 608.

Figure 7A:
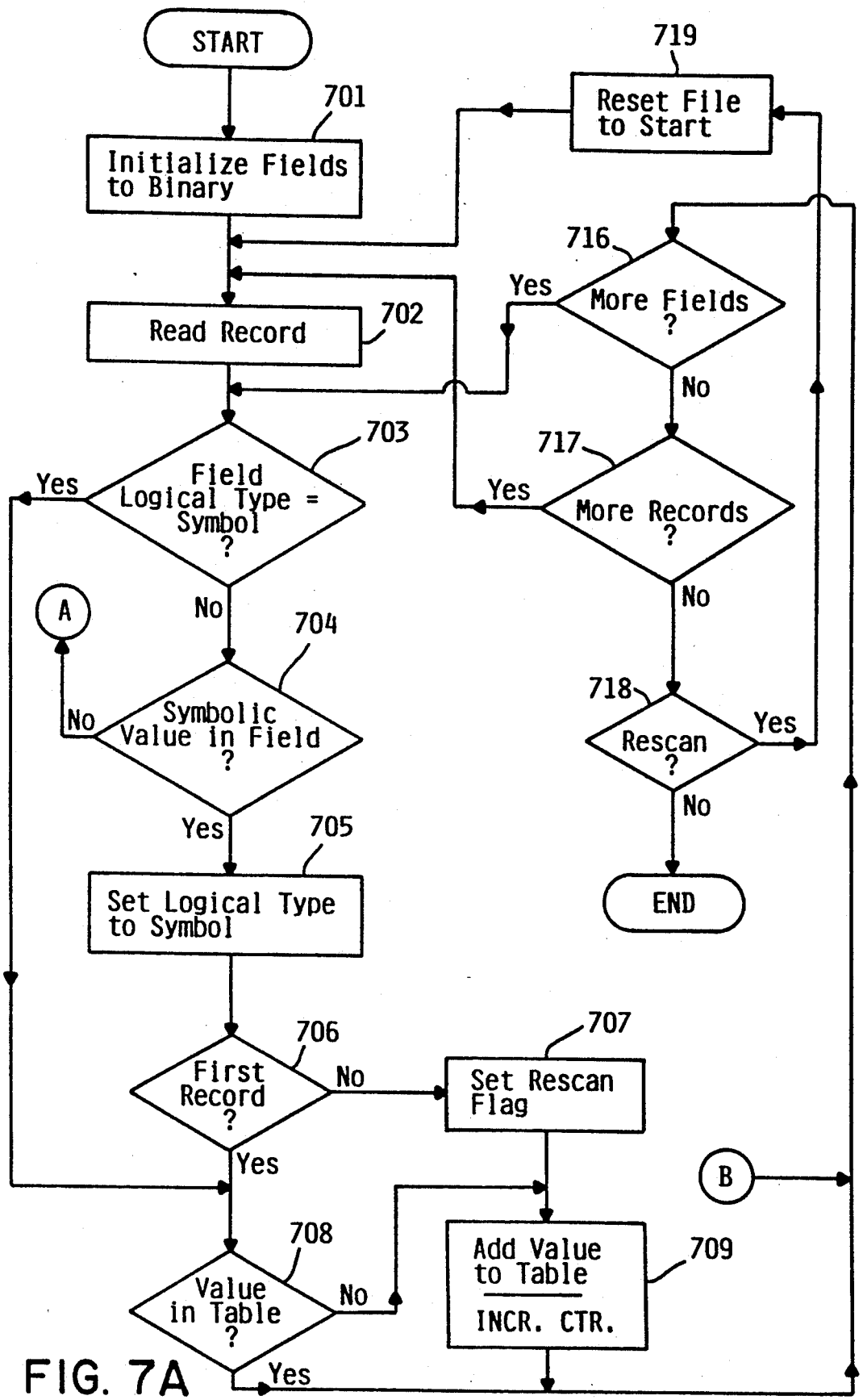
FIGS. 7A and 7B show the steps required to scan the source file to determine default logical data type according to the preferred embodiment.
Figure 7B:
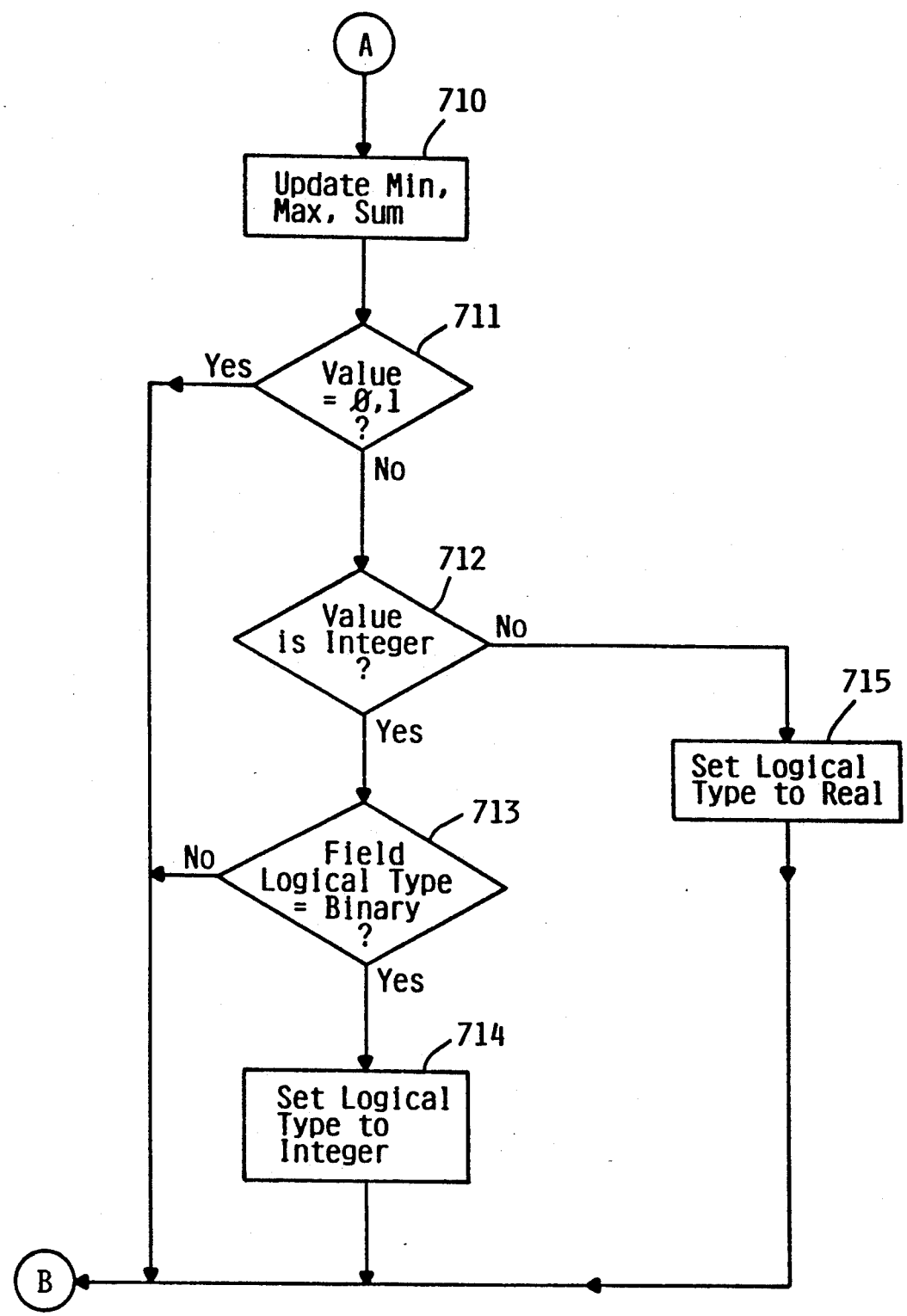

FIG. 7 shows in greater detail the major steps required of the template generator 303 to scan the source file to determine logical data type, which is shown in FIG. 6 as a single step at 604. The template generator will assign a logical data type of either SYMBOL, INTEGER, REAL or BINARY (Boolean) to each input data field, and generate an appropriate default output logical data type. The template generator initially assumes that all fields are BINARY at step 701. It sequentially reads each record in the source data file (step 702). For each record, it examines the value of each field. If the logical type of the field is not SYMBOL (step 703), and a symbolic value is encountered (step 704) (indicating the first symbolic value encountered), it sets the logical type of the field to SYMBOL at 705. If the record being scanned is not the first record in the file (step 706), it then sets a rescan flag (step 707). The rescan flag will force the template generator to make a second pass read of the source file records. If the logical type of the field was already SYMBOL (step 703) or is set to SYMBOL on the first record (steps 705,706), the generator compares the symbolic value to a table of symbolic values previously encountered in the field at 708. If the value has not been encountered, it adds the value to the table of previously encountered values and increments a counter of the number of different values at 709. If the logical field type was not SYMBOL and the value of the field in the record being examined was not symbolic (steps 703,704), the generator updates variables which hold the minimum value encountered, maximum value encountered, and sum of values at 710. These values are used later for scaling purposes. If the value is not 0 or 1 (step 711), but is an integer (step 712), and the logical field type is BINARY (step 713), the logical field type is set to INTEGER at 714. If the value is not an integer (step 712), the logical field type is set to REAL at 715. The template generator then examines the next field (step 716).

When no more records remain to be scanned (step 717), the generator examines the rescan flag of each field (step 718), and resets the file to scan it in again if any rescan flag is set (step 719). A second pass scan is necessary where symbolic data is encountered after the first record, because the generator did not recognize a field as symbolic immediately, and therefore would not have added the value encountered to its list of possible symbolic values. For example, if a symbolic field contained "0" in the first record, this would initially be interpreted as BINARY type data. Only after reading all records can it be known for certain whether a field is symbolic. On the rescan, only those fields with the rescan flag set will be examined.

Figure 8:
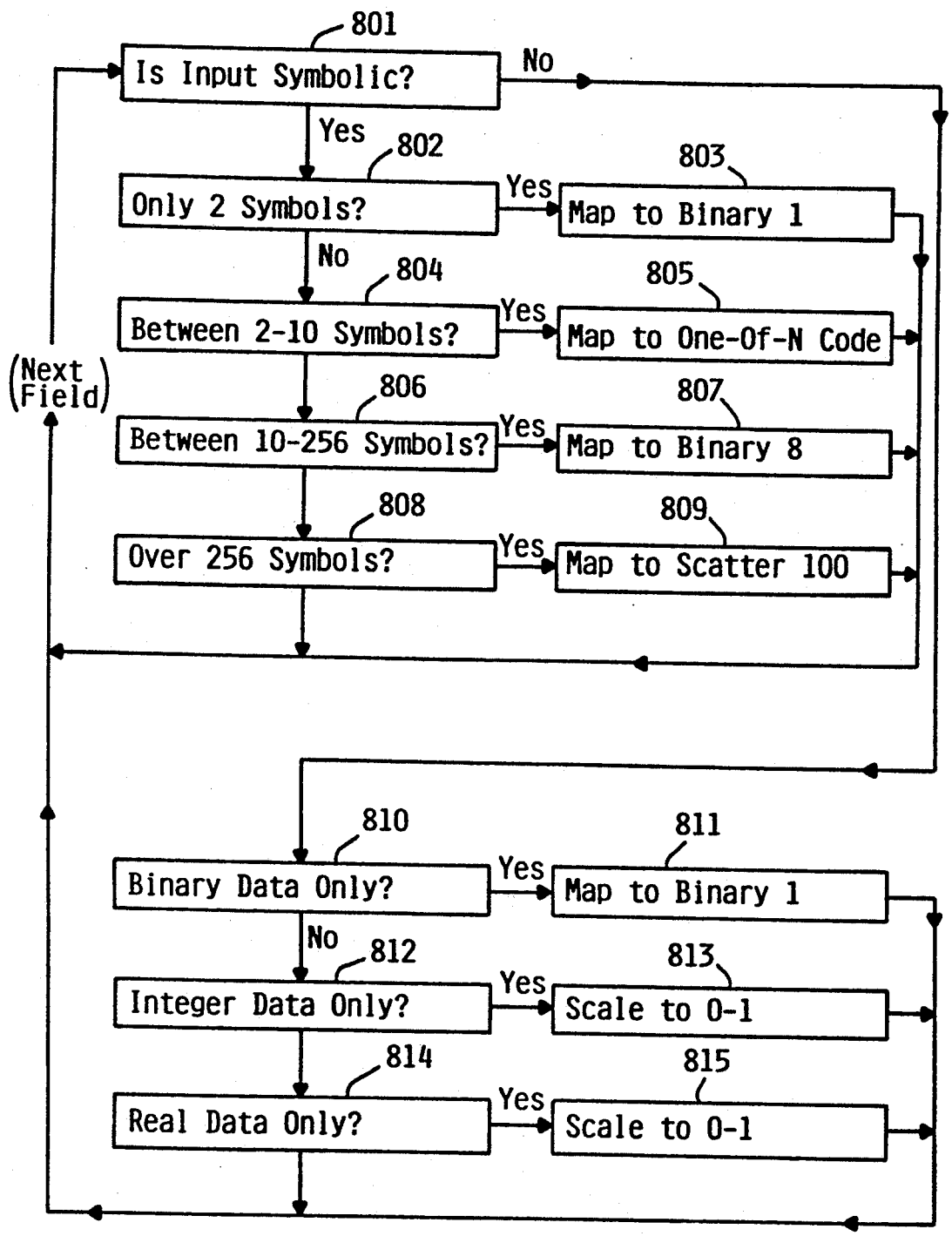
FIG. 8 shows the steps required to assign a default filter output data type according to the preferred embodiment.

After the scan of the source file is complete, the generator creates the default translate template and assigns default output logical data types (step 605, FIG. 6). The input logical data types are determined as described above. FIG. 8 shows the steps required in determining default output logical data types, which are performed as part of step 605. The output type is determined separately for each field. If the input type of the field is SYMBOL (step 801), the generator determines the output data type based on the number of different symbols encountered. If only two different symbols were encountered (step 802), the field is equivalent to a Boolean value, and maps to a BINARY output of length 1 at step 803. If between 3 and 10 unique symbols were encountered (step 804), the output field is type ONE-OF-N at step 805. If between 11 and 256 unique symbols were encountered (step 805), the output field is of type BINARY, with a length of 8 (step 806). If over 256 symbols were encountered (step 807), the output field is of type SCATTER (808). If the input data type is BINARY (only 0's and 1's were encountered) (step 810), the output maps to a type of BINARY with length of 1 (step 811). If the input data type is INTEGER or REAL (steps 812, 814), the output type is REAL, and the data is automatically scaled between 0 and 1 (steps 813, 815).

When the source file is scanned, the template generator will compute the minimum value, maximum value, and average value of the source data in each INTEGER or REAL field. By default, this data is automatically scaled to a real number between 0 and 1, i.e., the minimum value is mapped to 0, the maximum is mapped to 1, and the average is mapped to 0.5, and an appropriate mapping function constructed for all values in between. The use of a common range of input values generally improves the operation of the neural network. If the developer knows that the actual range of source values will be other than that represented by the training data in the source data file, he may specify different scaling values with the translate editor 302.

Translate editor 302 allows the developer to edit a translate template either after the default template has been generated by template generator 303 or in lieu of generating a default template. Editor 302 comprises a plurality of interactive editing screens, through which the developer may selectively enter information in the fields of the template. The operation of the editor is more fully described in Attachment 1 and Attachment 2.

The editor gives the developer greater flexibility in defining the data transformation to be performed by a filter. For example, the generator assumes one of four possible input logical data types for each field. If it sees the sequence "0100" in an input field, it assumes this is an integer (one hundred). However, it could be a binary number (four) or a one-of-N code. Editor 302 allows the developer to override such default assumptions made by generator 303.

Editor 302 also permits the developer to specify mathematical operations to be performed on the data, although an operation is not required. By default, the generator does not perform any operations on the data except scaling of integers and real numbers to a range between 0 and 1. Using editor 302, the developer may specify a scaling operation, threshold operation, or any of various trigonometric, exponential and other functions as enumerated in the Appendix. If a scaling operation is specified, the developer may specify the ranges and mid-points. A threshold operation is a mathematical step function which converts a range of values to a plurality of discrete values, and would typically be used, e.g. to convert numeric data such as a scaled real number between 0 and 1 to symbolic data such as "very unlikely", "unlikely", "uncertain", "likely", and "very likely". In this case, the developer must specify the threshold boundary values and the target values. The mathematical operator is recorded in Operator field 574 of the translate record. Editor 302 also permits the developer to specify when the mathematical operation is performed (either before, inline, or after data translation). This option is recorded in OpPosition field 575 of the translate record.

After a filter has been defined and a translate template has been generated, data translator 304 uses the template as a specification for the conversion of source data to target data. The translation process involves converting the input data to a single internal numeric value, which is then re-converted to the output data. For example, if a symbolic logical data input is to be converted to a one-of-N logical data output, translator 304 first accesses dictionary records 521-31 to determine the internal numeric value corresponding to the symbol. This internal value is then converted to a one-of-N output. Thus, even when both input and output have vector characteristics, as in the case of ONE-OF-N or THERMOMETER values, the input gets internally converted to a single numeric value. However, where the input types are one of the four designated VECTOR types (i.e., BINARY-VECTOR, INTEGER-VECTOR, REAL-VECTOR, or SYMBOL-VECTOR), the translation is performed separately on each vector element (each vector element is converted to an internal numeric value). The four designated VECTOR types are in effect only a shorthand way of specifying that a particular translation is to be repeated for more than one field. The same effect could be achieved by putting a separate entry in the template for each vector element, all entries specifying the same translation operations. However, in the case of a large vector, this could be extremely tedious.

Figure 9:
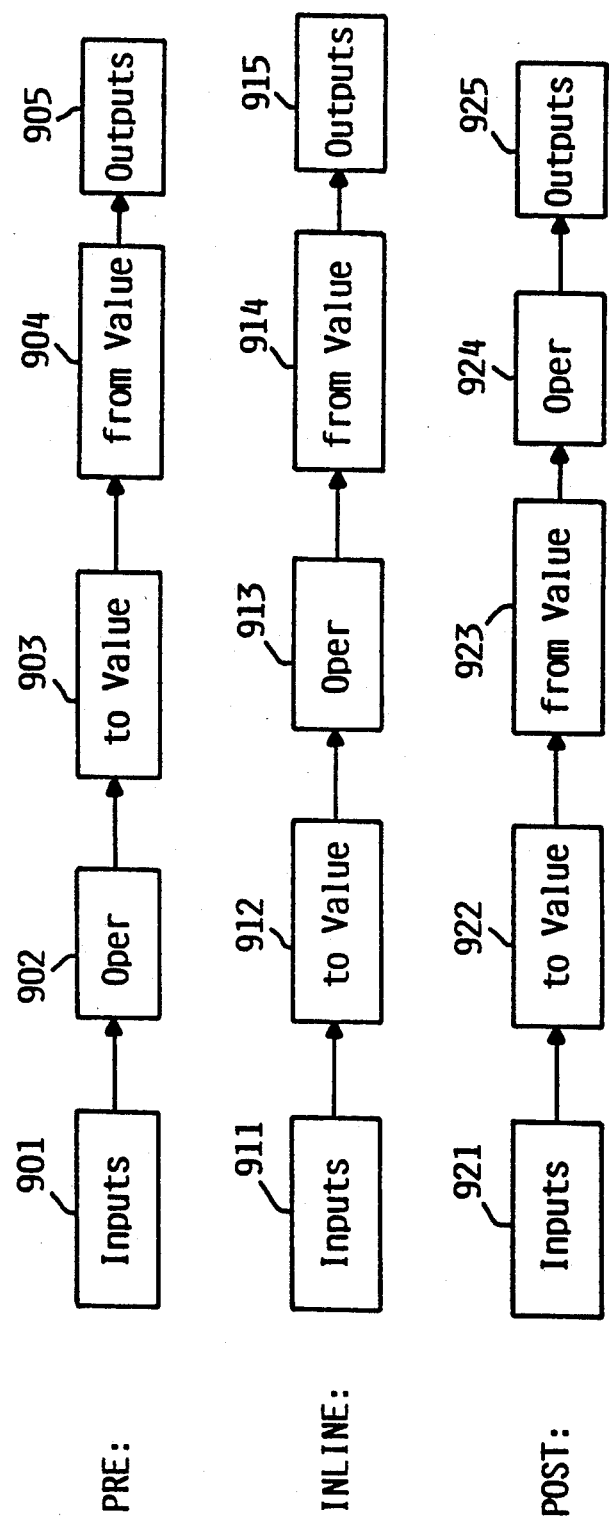
FIG. 9 shows the different ways in which data may be translated by a filter according to the preferred embodiment.

The translate template may specify a mathematical operation to be performed on the data being translated. This operation is performed either before (PRE), INLINE, or after (POST) the translations. These three options are shown in FIG. 9. In the PRE case, the operation (902) is performed directly on the raw input (901) to produce a modified input having the same logical data type as the raw input. This modified input is then converted to an internal numeric value (903,904) which may be of a different form. The internal numeric value is then converted to the output logical data type (905). In the INLINE case, the input (911) is first converted to an internal numeric value (912). The operator (913) then is applied to the internal numeric value to produce a modified internal numeric value (914). This modified internal numeric value is then converted to the output logical data type (915). In the POST case, the input (921) is converted to an internal numeric value (922,923), which is then converted to the output logical data type. The operator (924) is then applied to the output logical data type to produce the output (925). Translator 304 supports only a single mathematical operator for each source data field described in a template (i.e., each filter can perform only one mathematical operation on any given field). However, it is possible to define multiple filters in series, thus achieving more complex mathematical functions than are available from the menu of available choices.

When translating a source data file in the development environment (i.e., for training), data translator 304 translates data in any field with a Usage 571 of INPUT or OUTPUT. Data in any field with a Usage 571 of IGNORE is not processed by the translator, and no target data for that field is produced. The translation of source data with a usage of OUTPUT is necessary to tell the neural network the desired form and value of the raw output of the network. Since the output is numeric, it is specifying the number of elements and their ranges. It is also specifying particular desired mappings, i.e., that particular sets of input vectors should map to particular output vectors. For example, in the source and target files of FIG. 4, the mapping of four distinct symbolic values to a one-of-N vector specifies that a four element vector is required for the output. It also specifies what the required output values should be for four specific cases of input training data. The translation of source data with a usage of OUTPUT should not be confused with the translation of a raw output vector from the neural network to some other form. If it is desired to translate the output of the network, a separate filter must be defined and a separate translate template created. For this output filter, the "source" data is the raw output of the neural network, and the "target" data is the output translated to some desired (probably human readable) form.

For providing assistance to the developer, data translator 304 is capable of producing three types of target files as output: a symbolic data file, a numeric text data file, and a binary data file. Translator 304 can also generate separate training and test target data files from a single source data file. Training and test files are simply separate files composed from different records from the same source file. In the development environment, the use of a random set of test data from the same source helps to verify proper operation of the neural network. The developer can specify the percentage of records from the source file to be allocated to the training file and the test file. A symbolic target data file contains untranslated source data, with those records and fields not used left out. Such a file assists the developer during debug by presenting in human readable form the input data. A numeric text target data file contains translated numeric output in text readable form, and is again for the assistance of the developer. A Binary target data contains the translated numeric output in binary form, for input to the neural network.

Although in the preferred embodiment computer system 100 is an IBM Application System/400 system, and FIG. 1 depicts a single CPU, a single co-processor and a single storage, it should be understood that utility 121 actually supports a distributed processing environment. It is possible to perform all processing on a central computer system 100, but it is also possible to divide processing tasks and files between the host IBM AS/400 system and an intelligent workstation such as an IBM PS/2 computer system or an IBM RISC System/6000 computer system, or even to store all files and run all programs on the workstation. It is also possible to use other computer systems or combinations of systems, which may be general purpose systems stand-alone systems, host mainframes serving multiple remote workstations, networked systems, systems with special-purpose processing hardware, etc. For example, source data files 131-134 may reside in the address space of a general purpose host computer system, while editor programs which support neural network development reside in the address space of a programmable workstation, and run-time neural network models reside in a special numeric processor.

In the preferred embodiment, this invention supporting filtering of neural network inputs is part of a comprehensive neural network development and run-time utility. In an alternative embodiment, it is possible to practice this invention as a stand-alone neural network filtering utility. Such an alternative embodiment would be attractive, for example, where the neural network is an ideal neural network comprising a large number of physically distinct parallel processors. Such an ideal neural network may lack the flexibility of support for different neural network models that is part of the preferred embodiment, making a comprehensive utility as described herein unnecessary. However, such an ideal neural network would still require that inputs be presented to it in some proper form, and would present outputs to the user in a predetermined form. Such an alternative embodiment may also be attractive where the neural network processing takes place in an environment over which the developer has no control. For example, a neural network of predetermined structure may be maintained on a host computer system, in which multiple users have the capability to use the neural network but not to alter its structure. In such a case, the individual users would still have a need to convert data.

In the preferred embodiment, a translate template, capable of being edited by the developer, is used to define a data transformation. In an alternative embodiment, it is possible to practice this invention without such an editable data structure. For example, the data transformation definitions could be hard-coded into the data translator. In this alternative embodiment, some degree of flexibility could be achieved by allowing the user to alter the default data transformation definitions in the translator. For example, the user could be presented with a menu of possible choices for translating data of particular types.

Although a specific embodiment of the invention has been disclosed along with certain alternatives, it will be recognized by those skilled in the art that additional variations in form and detail may be made within the scope of the following claims.

What is claimed is:

1. An apparatus for facilitating the use of a neural network, comprising:
   means for receiving source data for the neural network, said source data comprising a plurality of source data fields;
   translation definition means for defining, with respect to each of said source data fields, a corresponding data transformation, wherein at least one of said data transformations is a transformation of data of one data type to data of another data type, and wherein said translation definition means comprises means for automatically generating a default data transformation definition with respect to each of said source data fields; and
   means, responsive to said translation definition means, for translating source data contained in each said source data field according to the data transformation corresponding to said source data field, to produce a neural network input.

2. The apparatus for facilitating the use of a neural network of claim 1, further comprising:
   means for receiving output data from the neural network, said output data comprising at least one output data field;
   output translation definition means for defining, with respect to an output data field, a corresponding data transformation of data of one data type to data of another data type; and
   means, responsive to said output translation definition means, for translating output data contained in said output data field according to the data transformation corresponding to said output data field, to produce a translated neural network output.

3. The apparatus for facilitating the use of a neural network of claim 1, wherein said means for automatically generating a default data transformation definition comprises means for automatically defining a scaling function with respect to each numeric source data field for translating source numeric data to numeric data in a predetermined range of values.

4. An apparatus for facilitating the use of a neural network, comprising:
   means for receiving source data for the neural network, said source data comprising a plurality of source data fields;
   translation definition means for defining, with respect to each of said source data fields, a corresponding data transformation, wherein at least one of said data transformations is a transformation of data of one data type to data of another data type, wherein said translation definition means comprises:
      (a) means for generating a translate template defining, with respect to each of said source data fields, a corresponding data transformation;
      (b) means for storing and retrieving said translate template; and
      (c) means for editing said translate template after it has been initially generated; and
   means, responsive to said translation definition means, for translating source data contained in each said source data field according to the data transformation corresponding to said source data field, to produce a neural network input.

5. The apparatus for facilitating the use of a neural network of claim 4, wherein said translation definition means comprises means for automatically generating a default translate template.

6. The apparatus for facilitating the use of a neural network of claim 5, wherein said means for automatically generating a default translate template comprises:
   means for scanning said source data to determine a logical data type for each of said source data fields;
   means for associating a default target logical data type with each logical data type for a source data field; and
   means for recording in said default translate template, with respect to each of said source data fields, said logical data type for the source data field and said default target logical data type associated with said logical data type for the source data field.

7. The apparatus for facilitating the use of a neural network of claim 5, wherein said means for automatically generating a default translate template comprises means for automatically defining a scaling function with respect to each numeric source data field for translating source numeric data to numeric data in a predetermined range of values.

8. A method for using a neural network, comprising the steps of:
   receiving source data for the neural network, said source data comprising a plurality of source data fields;
   defining, with respect to each of said source data fields, a corresponding data transformation, wherein at least one of said data transformations is a transformation of data of one data type to data of another data type, and wherein said step of defining a data transformation comprises: (a) automatically scanning said source data to determine the content thereof, and (b) automatically generating a default data transformation definition with respect to each of said source data fields based on information obtained from said step of automatically scanning said source data; and translating source data contained in each said source data field according to the data transformation corresponding to said source data field, to produce a neural network input.

9. The method for using a neural network of claim 8, further comprising the steps of:

receiving output data from the neural network, said output data comprising at least one output data field;

defining, with respect to an output data field, a corresponding data transformation of data of one data type to data of another data type; and translating output data contained in said output data field according to the data transformation corresponding to said output data field, to produce a translated neural network output.

10. The method for using a neural network of claim 8, wherein said step of automatically generating a default data transformation definition comprises automatically defining a scaling function with respect to each numeric source data field for translating source numeric data to numeric data in a predetermined range of values.

11. A method for using a neural network, comprising the steps of:

receiving source data for the neural network, said source data comprising a plurality of source data fields;

defining, with respect to each of said source data fields, a corresponding data transformation, wherein at least one of said data transformations is a transformation of data of one data type to data of another data type, and wherein said step of defining a data transformation comprises generating a translate template defining, with respect to each of said source data fields, a corresponding data transformation; and translating source data contained in each said source data field according to the data transformation corresponding to said source data field, to produce a neural network input.

12. The method for using a neural network of claim 11, further comprising the steps of:

storing said translate template;
retrieving said translate template from storage; and
editing said translate template after it has been initially generated.

13. The method for using a neural network of claim 11, wherein wherein said step of defining a data transformation comprises automatically generating a default translate template.

14. The method for using a neural network of claim 13, wherein said step of automatically generating a default translate template comprises:

scanning said source data to determine a logical data type for each of said source data fields;

associating a default target logical data type with each logical data type for a source data field; and recording in said default translate template, with respect to each of said source data fields, said logical data type for the source data field and said default target logical data type associated with said logical data type for the source data field.

15. The method for using a neural network of claim 13, wherein said step of automatically generating a default translate template comprises:

scanning said source data to determine a range of source data values;

defining a scaling function with respect to each numeric source data field for translating source numeric data to numeric data in a predetermined range of values, said scaling function being dependent on said range of source data values; and recording parameters of said scaling function in said default translate template.

16. A method for teaching a neural network having an input and an output for a result, comprising the steps of:

identifying source training data for said neural network;

defining a data transformation of said source training data, wherein said data transformation comprises transformation of data of one data type to data of another data type;

translating said source data in accordance with said data transformation definition to produce translated input training data;

presenting said translated input training data at said input of said neural network; and repeatedly editing said data transformation definition until said result at said output is within tolerance of a correct result.

17. The method for teaching a neural network of claim 16, wherein said step of defining a data transformation comprises:

automatically scanning said source data to determine the content thereof; and automatically generating a default data transformation definition with respect to each of said source data fields based on information obtained from said step of automatically scanning said source data.

18. The method for teaching a neural network of claim 17, wherein said step of automatically generating a default data transformation definition comprises automatically defining a scaling function with respect to each numeric source data field for translating source numeric data to numeric data in a predetermined range of values.

19. The method for teaching a neural network of claim 16, wherein:

said step of defining a data transformation comprises generating a translate template defining, with respect to each of said source data fields, a corresponding data transformation; and said step of repeatedly editing said data transformation definition comprises repeatedly editing said translate template.

20. A neural network driven artificial intelligence apparatus for producing results from source data, comprising:

a neural network, having a numeric input of a pre-defined data type and a numeric output;

means for automatically translating said source data to numeric input for said neural network, wherein said source data comprises data of a type other than said pre-defined data type of said numeric input, and wherein said means for automatically translating said source data comprises:

(a) means for generating a translate template defining, with respect to each of a plurality of source data fields, a corresponding data transformation;

(b) means for storing and retrieving said translate template;

(c) means for editing said translate template after it has been initially generated; and (d) means for translating source data according to the data transformation definition contained in said translate template; and means for presenting said source data translated to numeric input to said neural network.

21. The neural network driven artificial intelligence apparatus of claim 20, wherein said neural network comprises:

a programmable processor;

storage means for storing programs and data accessible to said processor; and a neural network simulation program, contained in said storage means, for executing on said programmable processor and thereby becoming a neural network.

22. The neural network driven artificial intelligence apparatus of claim 20, wherein said means for generating a translate template comprises:

means for scanning said source data to determine a logical data type for each of said source data fields;

means for associating a default target logical data type with each logical data type for a source data field; and means for recording in said translate template, with respect to each of said source data fields, said logical data type for the source data field and said default target logical data type associated with said logical data type for the source data field.

23. A neural network data filter, comprising:

means for receiving source data for the neural network;

means for receiving a translate template, said translate template comprising a logical input field specifying a logical data type for a source data field, and a logical output field specifying a logical data type for an output; and means for converting said source data from a form specified by said logical input field to a form specified by said logical output field.

24. The neural network data filter of claim 23, wherein:

said translate template further comprises a mathematical operator field specifying a mathematical operation; and said filter further comprises means for performing the mathematical operation specified by said mathematical operator field on data being converted by said converting means.

25. The neural network data filter of claim 23, wherein:

said translate template further comprises a scaling parameters field specifying parameters of a scaling operation; and said filter further comprises means for performing the scaling operation specified by said scaling parameters field on data being converted by said converting means.

* * * * *